US010369691B2

(12) United States Patent
Yamazaki et al.

(10) Patent No.: US 10,369,691 B2
(45) Date of Patent: Aug. 6, 2019

(54) ROBOT

(71) Applicant: Seiko Epson Corporation, Tokyo (JP)

(72) Inventors: Takema Yamazaki, Fujimi (JP); Takashi Nagate, Suwa (JP)

(73) Assignee: Seiko Epson Corporation (JP)

( * ) Notice: Subject to any disclaimer, the term of this patent is extended or adjusted under 35 U.S.C. 154(b) by 120 days.

(21) Appl. No.: 15/696,415

(22) Filed: Sep. 6, 2017

(65) Prior Publication Data

US 2017/0361457 A1   Dec. 21, 2017

Related U.S. Application Data

(63) Continuation of application No. 14/299,687, filed on Jun. 9, 2014, now Pat. No. 9,782,893.

(30) Foreign Application Priority Data

Jun. 14, 2013 (JP) ................. 2013-125323

(51) Int. Cl.
   *B66F 19/00* (2006.01)
   *B25J 9/00* (2006.01)
(52) U.S. Cl.
   CPC ........... *B25J 9/0087* (2013.01); *Y10S 901/23* (2013.01); *Y10T 74/20305* (2015.01); *Y10T 74/20317* (2015.01)
(58) Field of Classification Search
   CPC . B25J 9/1682; B25J 9/02; B25J 9/0096; B25J 15/0066; B25J 9/0006; B25J 9/0087; B25J 9/1676; B25J 19/06; B25J 19/005; Y10S 901/20; Y10S 901/23; Y10T 74/20305; Y10T 74/20317
   USPC ............ 294/213; 901/20, 23; 700/245
   See application file for complete search history.

(56) References Cited

U.S. PATENT DOCUMENTS

| | | |
|---|---|---|
| 2,858,947 A | 11/1958 | Chapman, Jr. |
| 4,762,455 A | 8/1988 | Coughlan et al. |
| 6,604,021 B2 | 8/2003 | Imai et al. |
| 7,366,587 B2 | 4/2008 | Iribe et al. |
| 7,765,031 B2 | 7/2010 | Nagamatsu |
| 8,315,735 B2 | 11/2012 | Nihei et al. |
| 8,818,558 B2 | 8/2014 | Cassano et al. |
| 2007/0118250 A1 | 5/2007 | Nagamatsu |
| 2008/0161970 A1 | 7/2008 | Adachi et al. |
| 2008/0309277 A1 | 12/2008 | Sugino et al. |
| 2010/0191372 A1 | 7/2010 | Nihei et al. |
| 2010/0236046 A1 | 9/2010 | Lundberg et al. |
| 2012/0048027 A1 | 3/2012 | Hashiguchi et al. |
| 2012/0228892 A1 | 9/2012 | Urabe et al. |
| 2012/0232690 A1 | 9/2012 | Gilchrist et al. |
| 2012/0239192 A1 | 9/2012 | Yamato et al. |
| 2013/0055560 A1 | 3/2013 | Nakasugi et al. |
| 2013/0073079 A1 | 3/2013 | Ouchi |
| 2013/0110288 A1 | 5/2013 | Cassano et al. |

(Continued)

FOREIGN PATENT DOCUMENTS

| | | |
|---|---|---|
| CN | 102672717 A | 9/2012 |
| CN | 102892557 A | 1/2013 |

(Continued)

*Primary Examiner* — Gabriela M Puig
(74) *Attorney, Agent, or Firm* — Harness, Dickey & Pierce, P.L.C.

(57) ABSTRACT

A robot includes a first arm and a second arm. The first arm and the second arm have different mechanisms from each other.

13 Claims, 10 Drawing Sheets

(56) References Cited

U.S. PATENT DOCUMENTS

| | | |
|---|---|---|
| 2013/0138244 A1 | 5/2013 | Nagasaka et al. |
| 2013/0199010 A1 | 8/2013 | Osato et al. |
| 2013/0346348 A1 | 12/2013 | Buehler et al. |
| 2014/0025202 A1 | 1/2014 | Umeno et al. |
| 2014/0067121 A1 | 3/2014 | Brooks et al. |
| 2014/0102239 A1 | 4/2014 | Umeno |
| 2014/0106386 A1 | 4/2014 | Umeno et al. |
| 2015/0104283 A1 | 4/2015 | Nogami et al. |
| 2016/0031084 A1* | 2/2016 | Yamazaki ............ B25J 9/1676 414/729 |

FOREIGN PATENT DOCUMENTS

| | | | | |
|---|---|---|---|---|
| JP | 06-143084 A | 5/1994 | | |
| JP | 06-348321 A | 12/1994 | | |
| JP | 07-178686 A | 7/1995 | | |
| JP | 08-161015 A | 6/1996 | | |
| JP | 2910305 B2 | 6/1999 | | |
| JP | 2003-071764 A | 3/2003 | | |
| JP | 2004-181600 A | 7/2004 | | |
| JP | 2006-035346 A | 2/2006 | | |
| JP | 2006-167902 A | 6/2006 | | |
| JP | 2007-118176 A | 5/2007 | | |
| JP | 2007-148527 A | 6/2007 | | |
| JP | 2008-006518 A | 1/2008 | | |
| JP | 2008-188699 A | 8/2008 | | |
| JP | 2010-029987 A | 2/2010 | | |
| JP | 2010-089200 A | 4/2010 | | |
| JP | 2010-188515 A | 9/2010 | | |
| JP | 2010-240793 A | 10/2010 | | |
| JP | 2011-051056 A | 3/2011 | | |
| JP | 2012-187643 A | 10/2012 | | |
| JP | 2012218192 A * | 11/2012 | ............ | B25J 9/0084 |
| JP | 2013-094956 A | 5/2013 | | |
| WO | WO-2009-113360 A1 | 9/2009 | | |

\* cited by examiner

ROBOT

CROSS-REFERENCE TO RELATED APPLICATIONS

This is a continuation patent application of U.S. application Ser. No. 14/299,687, filed Jun. 9, 2014, which claims priority to Japanese Patent Application No. 2013-125323, filed Jun. 14, 2013. The above applications are hereby incorporated by reference in their entireties.

BACKGROUND

1. Technical Field

The present invention relates to a robot.

2. Related Art

Recently, there have been significant technological advances in industrial robots. As such robots, for example, humanoid two-arm robots (hereinafter simply referred to as a robot) are known (see, for example, JP-A-2006-167902).

The robot disclosed in JP-A-2006-167902 includes a base, a trunk pivotally coupled to the base, and two multi-joint arms pivotally coupled to the trunk. This robot can carry and assembling components or the like by driving the individual arms separately.

Meanwhile, in some cases, it is preferable that work that requires high accuracy such as finely positioning components in relation to each other is carried out by a human. If work that can be carried out only by a human and work that can be carried out only by the above robot are done at the same time, that is, if the human and the robot collaborate, sharing a work space, production efficiency can be improved.

Generally, the respective arms of a robot are set with an equal operation area, operation speed, structure and the like. When a robot of such a configuration and a human collaborate, sufficient safety for the human needs to be secured. Moreover, when the human and the robot exchange work with each other (or take over each other's work), the exchange cannot be done smoothly. In this way, it is difficult for a robot and a human to collaborate.

SUMMARY

An advantage of some aspects of the invention is to provide a robot that can exhibit high safety when collaborating with a human, a robot control device, and a robot control method.

A robot according to an aspect of the invention includes a first arm and a second arm. The mechanism of the first arm is different from a mechanism of the second arm.

Thus, if, for example, a first operation area where the first arm operates is made smaller than a second operation area where the second arm operates in the mechanisms of the first arm and the second arm, a human can work safely on the side of the first arm when the human and the robot collaborate. Consequently, the robot can exhibit high safety when collaborating with a human.

In the robot according to the aspect of the invention, it is preferable that the robot includes a first drive motor to drive the first arm and a second drive motor to drive the second arm, and that a voltage applied to the first drive motor is lower than a voltage applied to the second drive motor.

Thus, the operation speed of the first arm can be made slower than the operation speed of the second arm. Consequently, the robot can exhibit higher safety when collaborating with a human.

In the robot according to the aspect of the invention, it is preferable that the robot grasps a component or workpiece with the first arm and grasps a tool with the second arm.

Thus, the work efficiency of the second arm is improved. Consequently, the work efficiency of the robot as a whole can be maintained.

In the robot according to the aspect of the invention, it is preferable that operation of the first arm is less than operation of the second arm.

Thus, the operation of the first arm can be reduced and consequently the robot can exhibit higher safety. Also, the work efficiency of the second arm is improved. Consequently, the work efficiency of the robot as a whole can be maintained.

In the robot according to the aspect of the invention, it is preferable that an operation speed of the first arm is slower than an operation speed of the second arm.

Thus, the robot can exhibit higher safety when collaborating with a human.

A robot according to another aspect of the invention includes: a robot main body having a base, a trunk coupled to the base, and a first arm and a second arm that are provided on the trunk via a center axis of the trunk and are capable of operating; and a control unit that controls driving of the first arm and the second arm. The control unit is capable of performing control so that a first operation area where the first arm operates is smaller than a second operation area where the second arm operates.

Thus, a human can work safely on the side of the first arm when the human and the robot collaborate. Consequently, the robot can exhibit high safety when collaborating with a human.

In the robot according to the aspect of the invention, it is preferable that, if an x-axis, a y-axis and a z-axis that are orthogonal to each other are set, the first arm and the second arm operate in the direction of the x-axis, in the direction of the y-axis and in the direction of the z-axis, and that the control unit performs control so that the volume of the first operation area is 10% or greater and 70% or smaller than the volume of the second operation area.

Thus, the robot can exhibit higher safety when collaborating with a human.

In the robot according to the aspect of the invention, it is preferable that, if an x-axis, a y-axis and a z-axis that are orthogonal to each other are set, the control unit performs control so that the lengths of the first operation area in the direction of the x-axis, in the direction of the y-axis and in the direction of the z-axis are shorter than the lengths of the second operation area in the direction of the x-axis, in the direction of the y-axis and in the direction of the z-axis, respectively.

Thus, the robot can exhibit higher safety when collaborating with a human.

In the robot according to the aspect of the invention, it is preferable that a work area where a distal end of the first arm can operate and a work area where a distal end of the second arm can operate have an overlap area with each other, and that the control unit performs control so that the second arm operates preferentially in the overlap area.

Thus, the operation of the first arm can be reduced and the robot can exhibit higher safety when collaborating with a human.

In the robot according to the aspect of the invention, it is preferable that a human work area where a human carries out work is provided on the side of the first arm, and that the control unit performs control so that the first operation area does not overlap with the human work area.

Thus, the robot can exhibit higher safety when collaborating with a human.

In the robot according to the aspect of the invention, it is preferable that the robot includes a first drive motor to drive the first arm and a second drive motor to drive the second arm, and that the control unit performs control so that the rotational speed of the first drive motor is slower than the rotational speed of the second drive motor.

Thus, the operation speed of the first arm can be made slower than the operation speed of the second arm. Consequently, the robot can exhibit higher safety when collaborating with a human.

In the robot according to the aspect of the invention, it is preferable that the robot includes a first drive motor to drive the first arm and a second drive motor to drive the second arm, and that the control unit performs control so that the amount of heat generated by the first drive motor is smaller than the amount of heat generated by the second drive motor.

Thus, the operation speed of the first arm can be made slower than the operation speed of the second arm. Consequently, the robot can exhibit higher safety when collaborating with a human. Moreover, since the amount of heat generated by the first drive motor is smaller than the amount of heat generated by the second drive motor, inconveniences due to heat generation can be restrained.

In the robot according to the aspect of the invention, it is preferable that the robot includes a first drive motor to drive the first arm and a second drive motor to drive the second arm, and that the control unit performs control so that the torque of the first drive motor is smaller than the torque of the second drive motor.

Thus, the operation speed of the first arm can be made slower than the operation speed of the second arm. Consequently, the robot can exhibit higher safety when collaborating with a human. Moreover, since the torque of the first drive motor is smaller than the torque of the second drive motor, for example, if the first arm and the second arm accidentally collide with each other, the first arm will be damaged preferentially over the second arm. Therefore, the robot can be used again simply by replacing or repairing the first arm.

In the robot according to the aspect of the invention, it is preferable that the robot is configured to carry out assembly work of assembling a first structure and a second structure together, and that the control unit, when carrying out the assembly work, performs control so that the first arm holds the first structure in a stationary state while the second arm brings the second structure closer to the first structure.

Thus, the operation of the first arm can be reduced and consequently the robot can exhibit higher safety.

In the robot according to the aspect of the invention, it is preferable that the control unit, when starting up the first arm and the second arm, performs control so that the second arm is started up before the first arm.

Thus, a human on the side of the first arm can confirm the startup of the second arm and can easily predict the subsequent startup of the first arm.

In the robot according to the aspect of the invention, it is preferable that a work area where a human carries out work is provided on the side of one of the first arm and the second arm, and that the control unit performs control so that the first operation area becomes smaller than the second operation area in the state where the work area is set on the side of the first arm, whereas the second operation area becomes smaller than the first operation area in the state where the work area is set on the side of the second arm.

Thus, the work area can be provided either on the side of the first arm or on the side of the second arm.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of a robot, a robot control device and a robot control method will be described with reference to the accompanying drawings.

Figure 1:
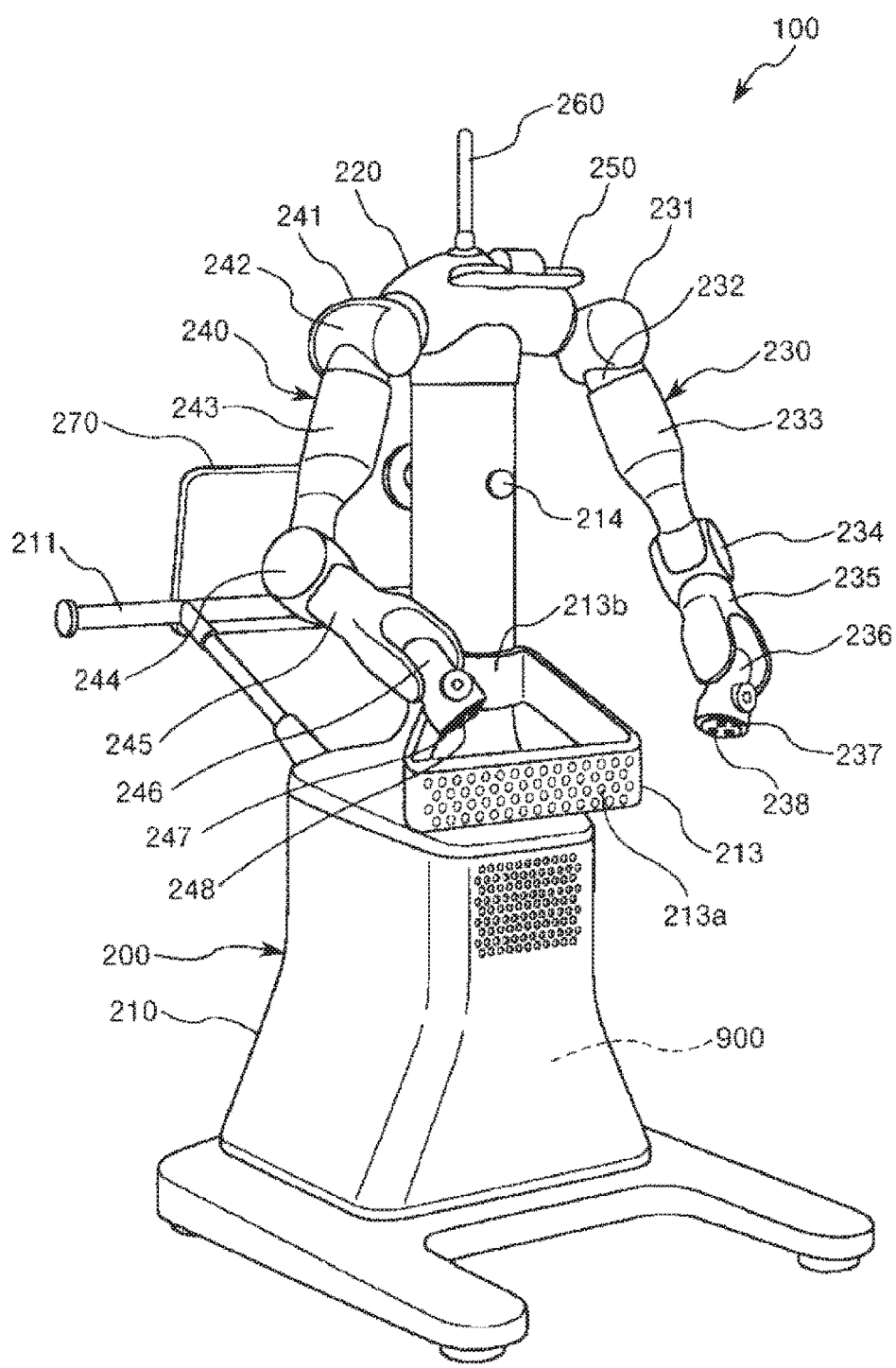
FIG. 1 a perspective view showing a preferred embodiment of a robot according to the invention.
Figure 2:
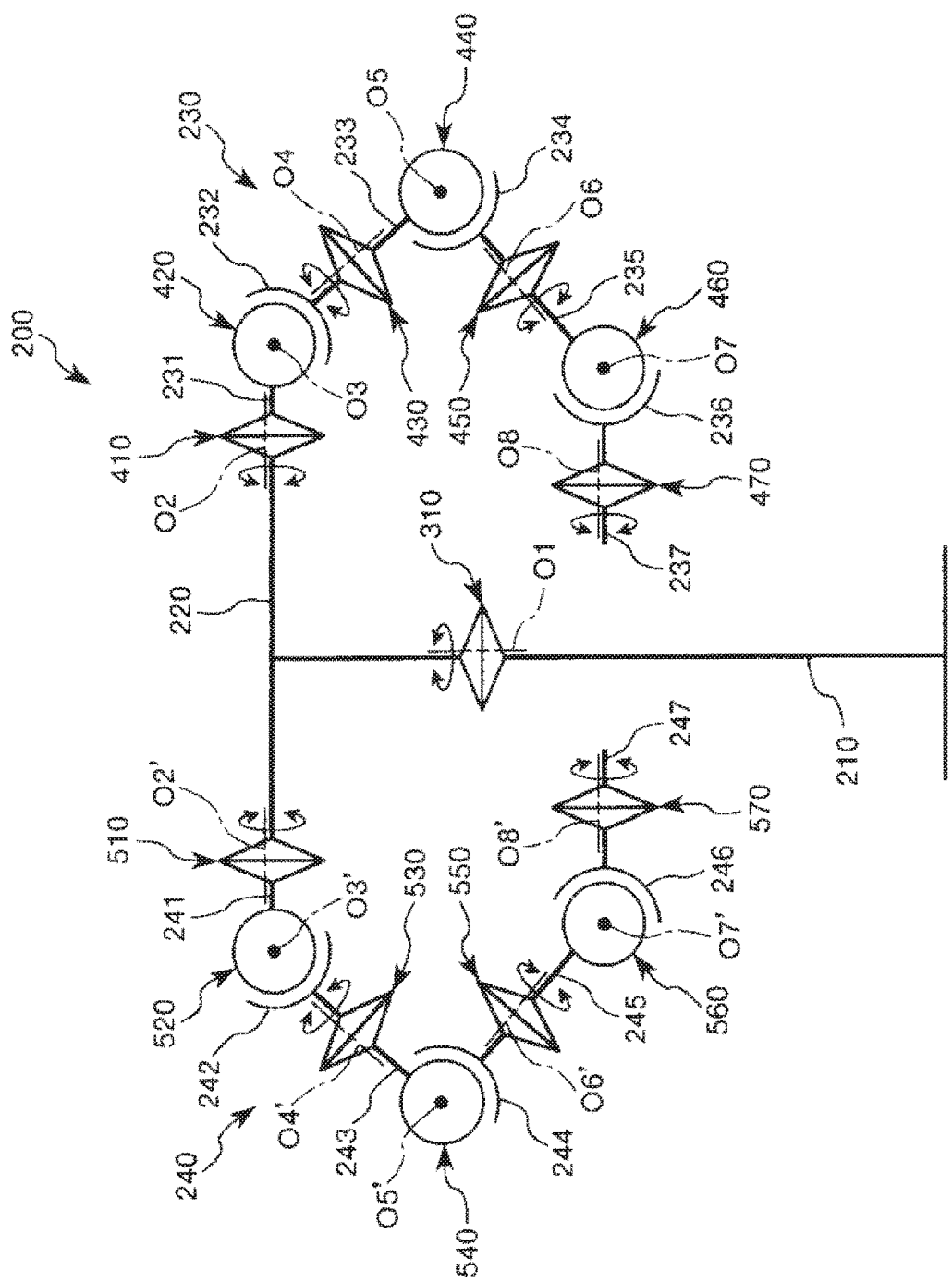
FIG. 2 is a schematic configuration view showing the pivots in the robot shown in FIG. 1.
Figure 3:
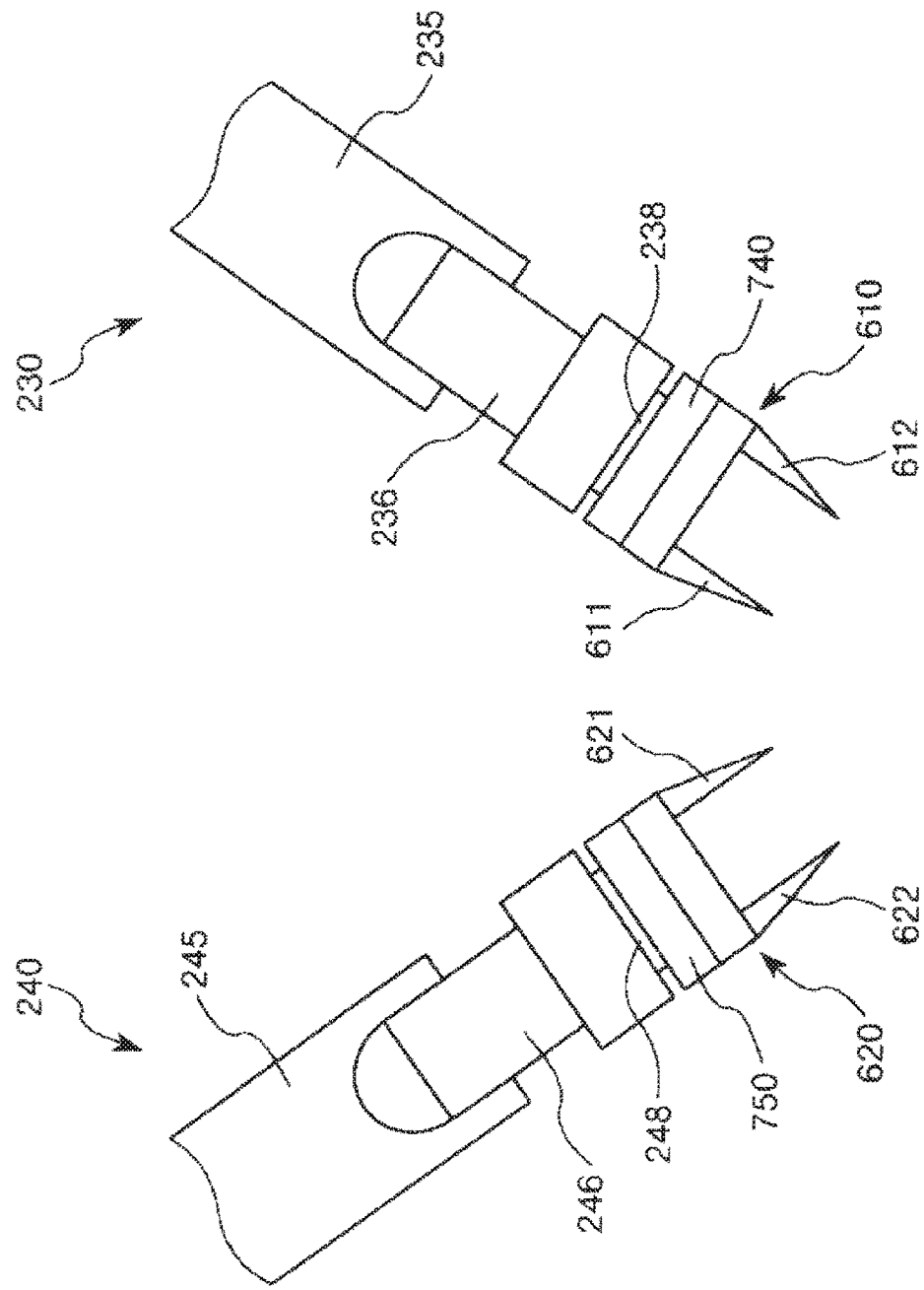
FIG. 3 shows an end effector installed on the robot shown in FIG. 1.
Figure 4:
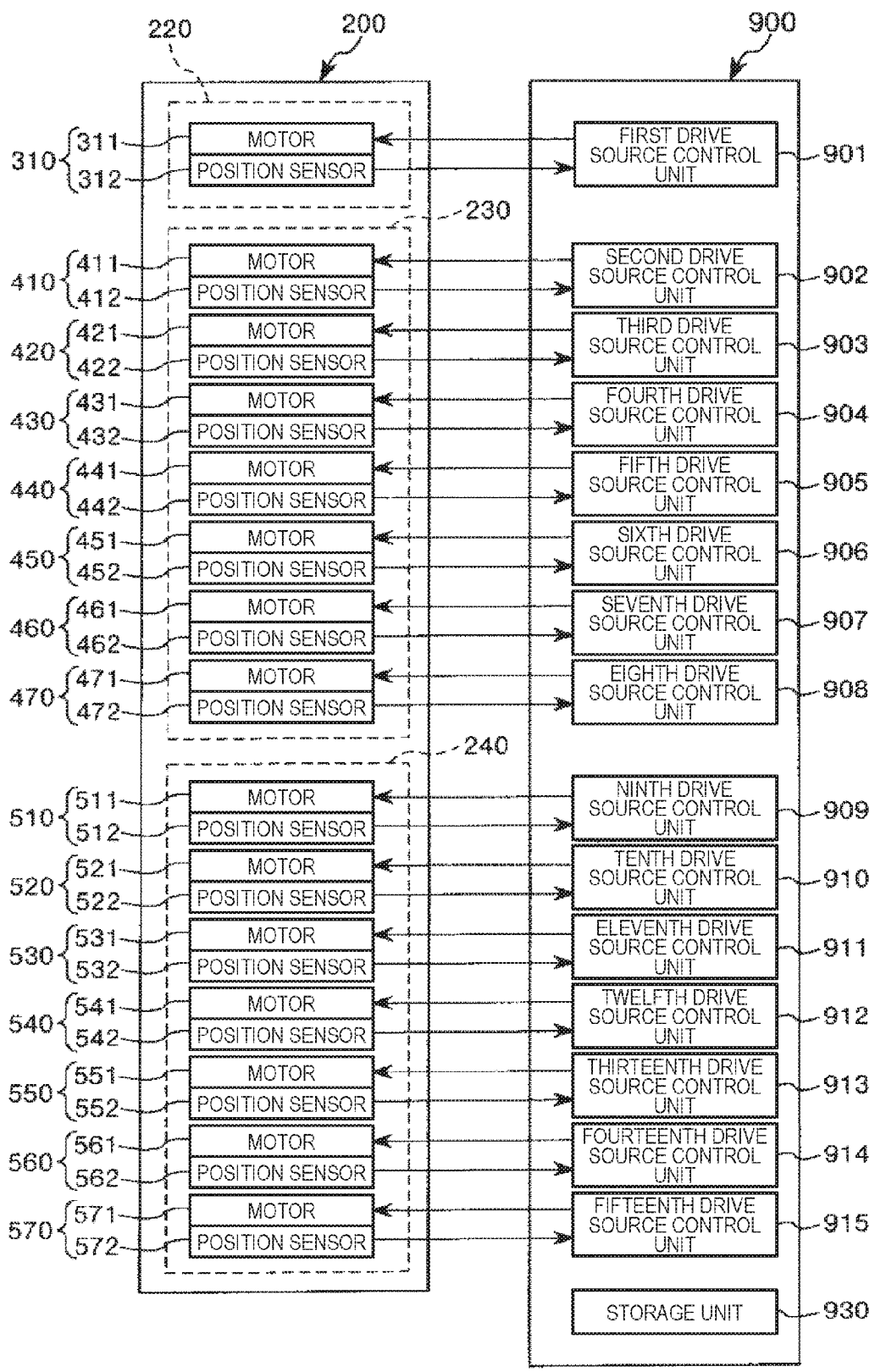
FIG. 4 is a block diagram showing the control system of the robot shown in FIG. 1.
Figure 5:
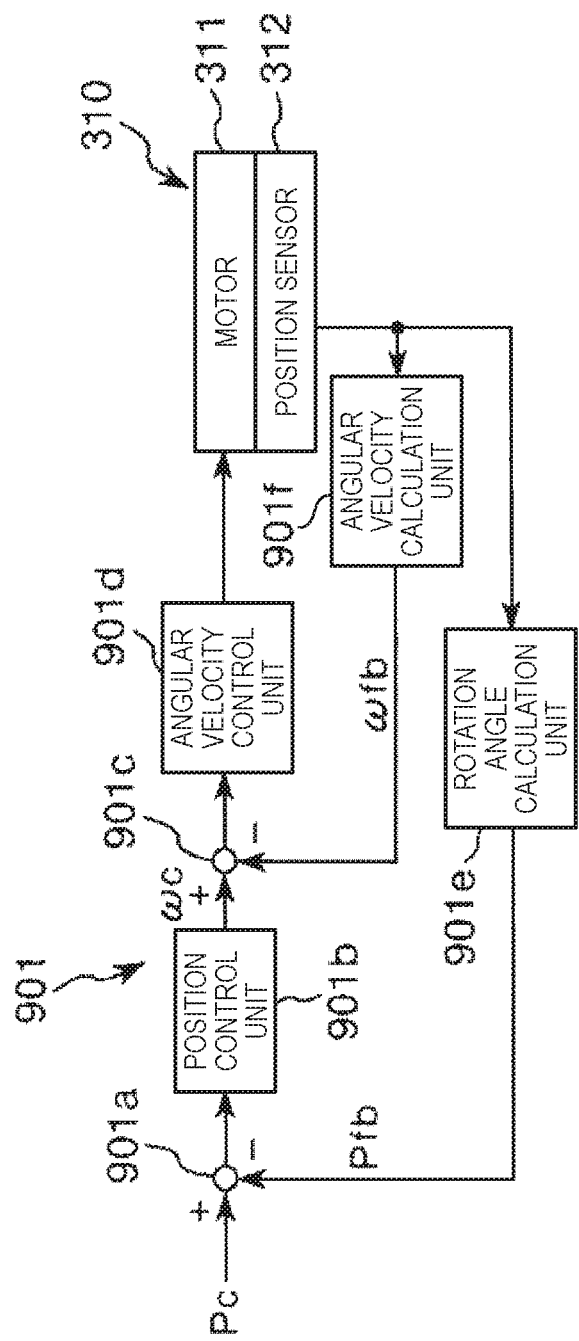
FIG. 5 is a block diagram showing drive control of the robot shown in FIG. 1.
Figure 6:
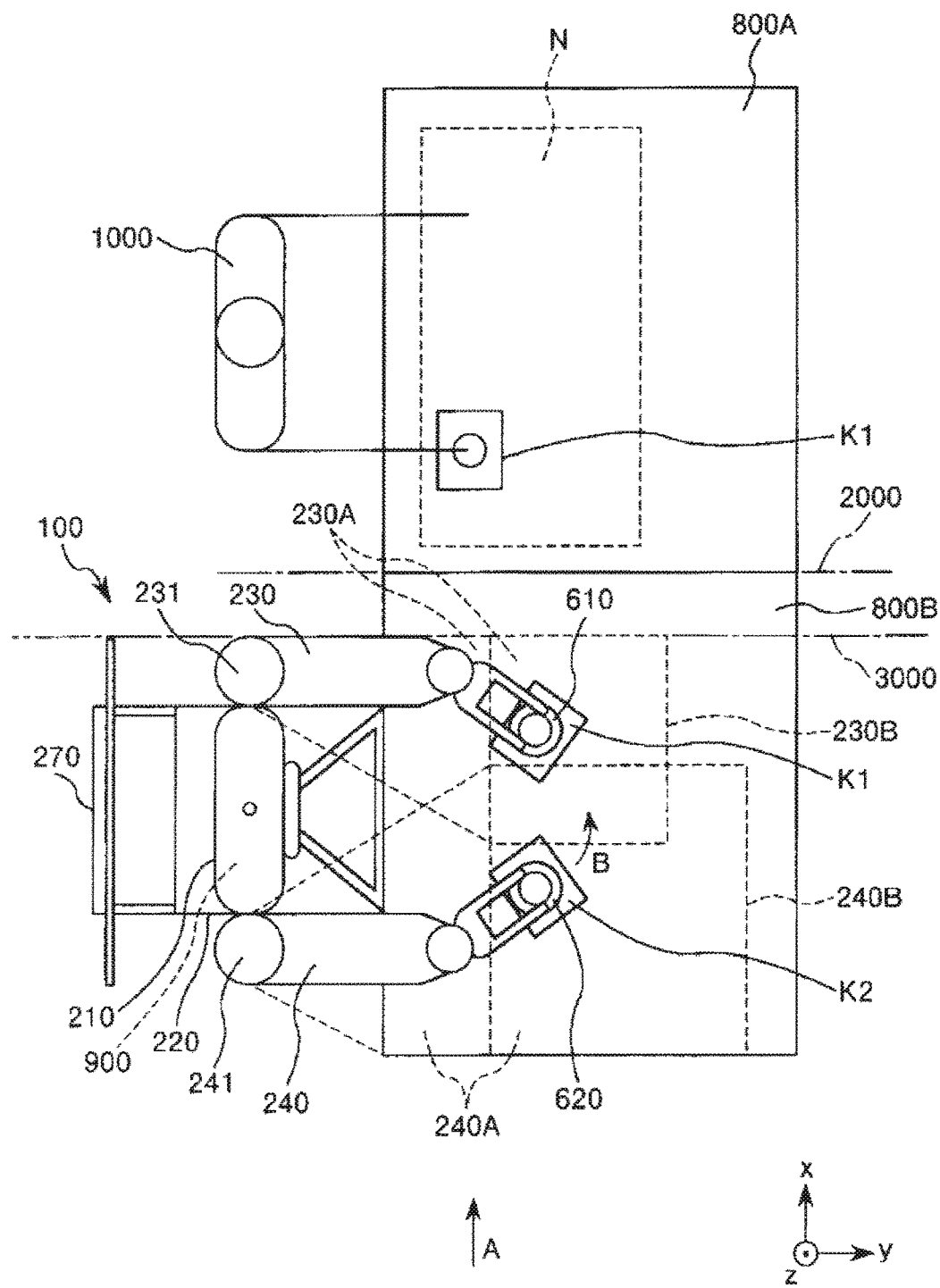
FIG. 6 shows the operating state of the robot shown in FIG. 1.
Figure 7:
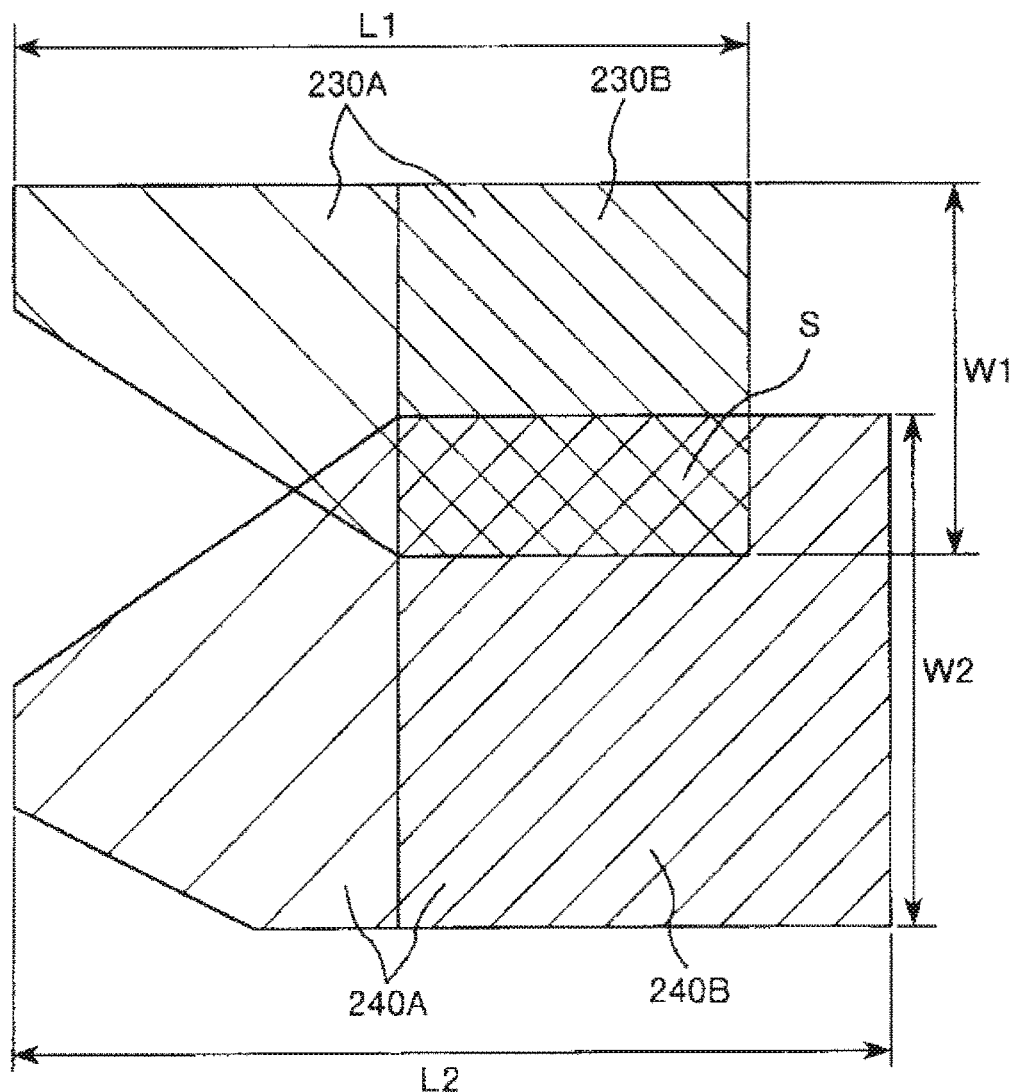
FIG. 7 illustrates the operation areas of the multi-joint arms shown in FIG. 6.
Figure 8:
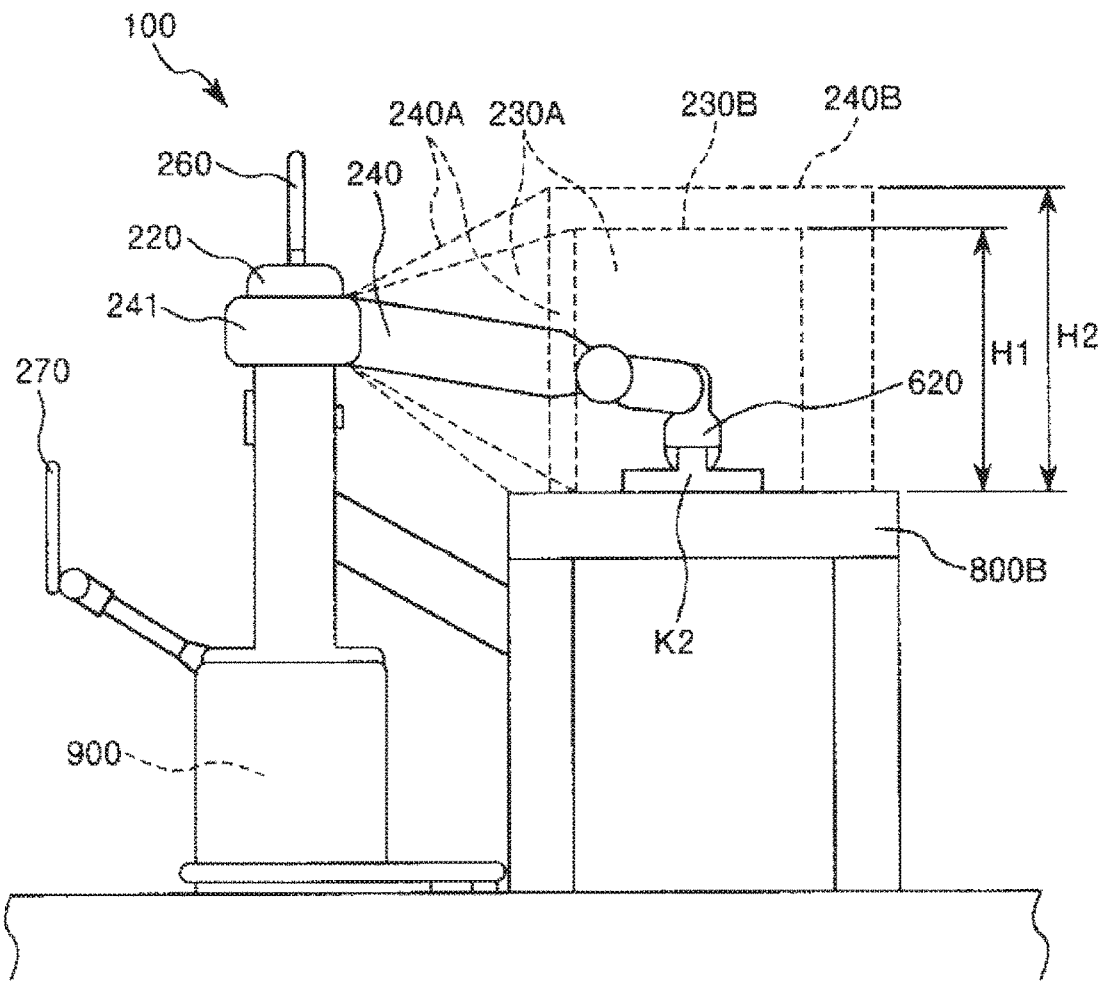
FIG. 8 is a view taken from the direction of arrow A in FIG. 6.
Figure 9:
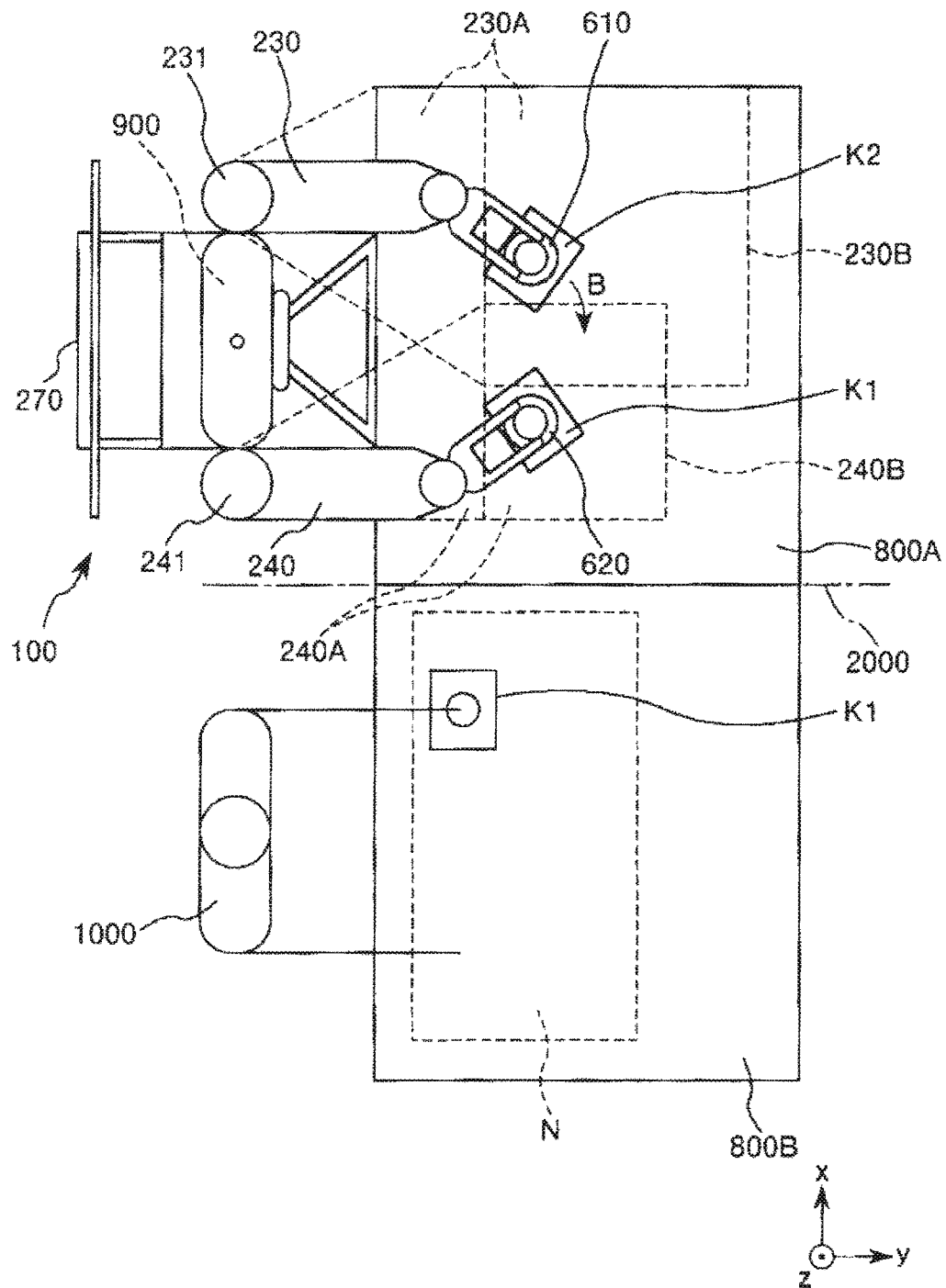
FIG. 9 shows the operating state of the robot shown in FIG. 1.
Figure 10:
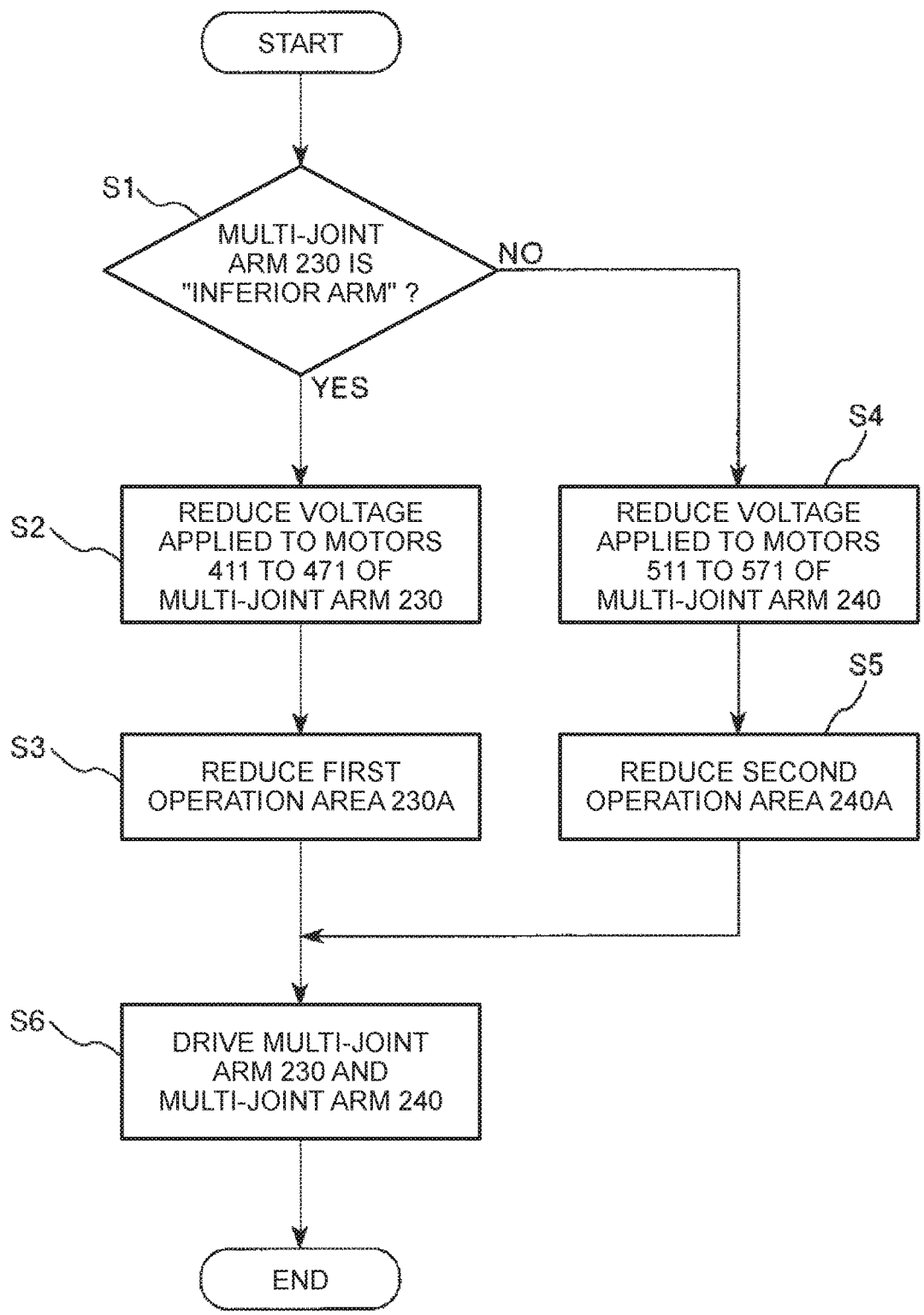
FIG. 10 is a flowchart showing a control method with a robot control device.

FIG. 1 is a perspective view showing a preferred embodiment of the robot according to the invention. FIG. 2 is a schematic configuration view showing the pivots in the robot shown in FIG. 1. FIG. 3 shows an end effector installed on the robot shown in FIG. 1. FIG. 4 is a block diagram showing the control system of the robot shown in FIG. 1. FIG. 5 is a block diagram showing drive control of the robot shown in FIG. 1. FIG. 6 shows the operating state of the robot shown in FIG. 1. FIG. 7 illustrates the operation areas of the multi-joint arms shown in FIG. 6. FIG. 8 is a view taken from the direction of arrow A in FIG. 6. FIG. 9 shows the operating state of the robot shown in FIG. 1. FIG. 10 is a flowchart showing a control method with a robot control device. In FIGS. 6 to 9, an x-axis, a y-axis and a z-axis are illustrated as three axes that are orthogonal to each other as a matter of convenience.

A robot 100 shown in FIG. 1 can be used in a manufacturing process to manufacture precision devices, for example, wristwatch or the like, and includes a robot main body 200 and a robot control device (control unit) 900 which controls the operation of the robot main body 200. Hereinafter, the robot main body 200 and the robot control device 900 will be described in order.

Robot Main Body

As shown in FIG. 1, the robot main body 200 is a two-arm robot and includes a base 210, a trunk 220 coupled to the base 210, a multi-joint arm (first arm) 230 and a multi-joint arm (second arm) 240 that are provided via the center axis of the trunk 220 and are capable of operating, a stereo camera 250 provided in front of the trunk 220, hand cameras (not shown) provided on the multi-joint arms 230, 240, respectively, a signal lamp 260 provided on the trunk 220, and a monitor 270 provided on the back side of the trunk 220.

With such a robot 100, it is possible to carry out work while using the stereo camera 250 and the hand cameras to check the positions of components, tools and the like on a worktable 800B (see FIG. 6). The signal lamp 260 enables easy check on the state of the robot 100 (driven state, normal stop state, abnormal stop state or the like). Also, since information about the robot 100 is displayed on the monitor 270, the state of the robot 100 can be checked easily. The monitor 270 is formed, for example, as a touch panel and operating the touch panel enables switching between display windows, giving a command to the robot 100 or change to a command that is already given.

Base

The base 210 is provided with plural wheels (rotating members) that facilitate movement of the robot 100, a lock mechanism (not shown) that locks each wheel, and a handle (grip portion) 211 that the user grasps when moving the robot 100. By unlocking the lock mechanism and grasping the handle 211 to push and pull, the user can freely move the robot 100. By locking the wheels via the lock mechanism, the user can fix the robot 100 at a predetermined position. Facilitating the movement of the robot 100 in this manner improves the convenience of the robot 100. It should be noted that each of the wheels, the lock mechanism and the handle 211 may be omitted.

The base 210 is also provided with a bumper 213 to abut against the worktable 800B, not shown. As the bumper 213 abuts the lateral side of the worktable 800B, the robot 100 can face the worktable 800B, spaced a predetermined distance apart. Therefore, unintended contact or the like between the robot 100 and the worktable 800B can be prevented. The bumper 213 has an abutting portion 213*a* that abuts against the worktable 800B, and a fixed portion 213*b* that is fixed on the base 210. In FIG. 1, the bumper 213 is installed on the base 210 in such a way that the abutting portion 213*a* is located below the fixed portion 213*b*. Such a bumper 213 is attachable to and removable from the base 210 and the direction of the bumper 213 can be vertically inverted. That is, the bumper 213 can be installed on the base 210 in such a way that the abutting portion 213*a* is located above the fixed portion 213*b*, as opposed to FIG. 1. In production sites, worktables 800B that are approximately 700 mm and approximately 1000 mm in height are used in general. Therefore, by changing the height of the abutting portion 213*a*, it is possible to cope with either one of the worktables with different heights.

The base 210 is also provided with an emergency stop button 214. Pressing this emergency button 214 can immediately stop the robot 100 in emergencies.

Trunk

As shown in FIG. 2, the trunk 220 is coupled to the base 210 pivotally on a pivot O1 via a joint mechanism 310. As described above, the trunk 220 is also provided with the stereo camera 250 and the signal lamp 260.

The joint mechanism 310 may include a motor 311 as a drive source, a decelerator (not shown) that reduces the rotational speed of the motor 311, and a position sensor 312 that detects the rotation angle of the motor 311, as shown in FIG. 4, though the configuration of the joint mechanism 310 is not particularly limited as long as the trunk 220 can be pivotal on the pivot O1 in relation to the base 210. As the motor 311, for example, a servo motor such as AC servo motor or DC servo motor can be used. As the decelerator, for example, a planetary gear decelerator, Harmonic Drive (trademark registered) or the like can be used. As the position sensor 312, for example, an encoder, rotary encoder, resolver, potentiometer or the like can be used.

Multi-Joint Arm

As shown in FIG. 1, the multi-joint arm 230 includes a first shoulder portion 231 coupled to the trunk 220 via a joint mechanism 410, a second shoulder portion 232 coupled to the first shoulder portion 231 via a joint mechanism 420, an upper arm portion 233 coupled to the distal end of the second shoulder portion 232 via a torsion mechanism 430, a first forearm portion 234 coupled to the distal end of the upper arm portion 233 via a joint mechanism 440, a second forearm portion 235 coupled to the distal end of the first forearm portion 234 via a torsion mechanism 450, a wrist portion 236 coupled to the distal end of the second forearm portion 235 via a joint mechanism 460, and a coupling portion 237 coupled to the distal end of the wrist portion 236 via a torsion mechanism 470. A hand portion 238 is provided on the coupling portion 237. On the hand portion 238, an end effector 610 corresponding to the work to be executed by the robot 100 is installed via a force sensor 740.

As shown in FIG. 2, the joint mechanism 410 causes the first shoulder portion 231 to pivot on a pivot O2 that is orthogonal to the pivot O1, in relation to the trunk 220. The joint mechanism 420 causes the second shoulder portion 232 to pivot on a pivot O3 that is orthogonal to the pivot O2, in relation to the first shoulder 231. The torsion mechanism 430 causes the upper arm portion 233 to pivot (twist) on a pivot O4 that is orthogonal to the pivot O3, in relation to the second shoulder portion 232. The joint mechanism 440 causes the first forearm portion 234 to pivot on a pivot O5 that is orthogonal to the pivot O4, in relation to the upper arm portion 233. The torsion mechanism 450 causes the second forearm portion 235 to pivot (twist) on a pivot O6 that is orthogonal to the pivot O5, in relation to the first forearm portion 234. The joint mechanism 460 causes the wrist portion 236 to pivot on a pivot O7 that is orthogonal to the pivot O6, in relation to the second forearm portion 235. The torsion mechanism 470 causes the coupling portion 237 to pivot (twist) on a pivot O8 that is orthogonal to the pivot O7, in relation to the wrist portion 236. Such a multi-joint arm 230 can realize bending and stretching of the joints (shoulder, elbow and wrist) and twisting of the upper arm and the forearm, as in a human arm part, with a relatively simple configuration.

The configurations of the joint mechanism 410, the joint mechanism 420, the torsion mechanism 430, the joint mechanism 440, the torsion mechanism 450, the joint mechanism 460 and the torsion mechanism 470 in this embodiment are similar to that of the joint mechanism 310, though the configuration of each of these mechanisms is not particularly limited. That is, as shown in FIG. 4, the joint mechanism 410 has a motor 411 as a drive source, a decelerator (not shown) that reduces the rotational speed of the motor 411, and a position sensor 412 that detects the rotation angle of the motor 411. The joint mechanism 420 has a motor 421 as a drive source, a decelerator (not shown) that reduces the rotational speed of the motor 421, and a position sensor 422 that detects the rotation angle of the motor 421. The torsion mechanism 430 has a motor 431 as a drive source, a decelerator (not shown) that reduces the rotational speed of the motor 431, and a position sensor 432 that detects the rotation angle of the motor 431. The joint mechanism 440 has a motor 441 as a drive source, a decelerator (not shown) that reduces the rotational speed of the motor 441, and a position sensor 442 that detects the rotation angle of the motor 441. The torsion mechanism 450 has a motor 451 as a drive source, a decelerator (not shown) that reduces the rotational speed of the motor 451, and a position sensor 452 that detects the rotation angle of the motor 451. The joint mechanism 460 has a motor 461 as a drive source, a decelerator (not shown) that reduces the rotational speed of the motor 461, and a position sensor 462 that detects the rotation angle of the motor 461. The torsion mechanism 470 has a motor 471 as a drive source, a decelerator (not shown) that reduces the rotational speed of the motor 471, and a position sensor 472 that detects the rotation angle of the motor 471. Such a multi-joint arm 230 can operate in the three directions (three dimensions) of x-axis direction, y-axis direction and z-axis direction.

The multi-joint arm 240 has a similar configuration to the multi-joint arm 230. That is, as shown in FIG. 1, the multi-joint arm 240 includes a first shoulder portion 241 coupled to the trunk 220 via a joint mechanism 510, a second shoulder portion 242 coupled to the first shoulder portion 241 via a joint mechanism 520, an upper arm portion 243 coupled to the distal end of the second shoulder portion 242 via a torsion mechanism 530, a first forearm portion 244 coupled to the distal end of the upper arm portion 243 via a joint mechanism 540, a second forearm portion 245 coupled to the distal end of the first forearm portion 244 via a torsion mechanism 550, a wrist portion 246 coupled to the distal end of the second forearm portion 245 via a joint mechanism 560, and a coupling portion 247 coupled to the distal end of the wrist portion 246 via a torsion mechanism 570. A hand portion 248 is provided on the coupling portion 247. On the hand portion 248, an end effector 620 corresponding to the work to be executed by the robot 100 is installed via a force sensor 750. Such a multi-joint arm 240 can operate in the three directions (three dimensions) of x-axis direction, y-axis direction and z-axis direction.

As shown in FIG. 2, the joint mechanism 510 causes the first shoulder portion 241 to pivot on a pivot O2' that is orthogonal to the pivot O1, in relation to the trunk 220. The joint mechanism 520 causes the second shoulder portion 242 to pivot on a pivot O3' that is orthogonal to the pivot O2', in relation to the first shoulder 241. The torsion mechanism 530 causes the upper arm portion 243 to pivot (twist) on a pivot O4' that is orthogonal to the pivot O3', in relation to the second shoulder portion 242. The joint mechanism 540 causes the first forearm portion 244 to pivot on a pivot O5' that is orthogonal to the pivot O4', in relation to the upper arm portion 243. The torsion mechanism 550 causes the second forearm portion 245 to pivot (twist) on a pivot O6' that is orthogonal to the pivot O5', in relation to the first forearm portion 244. The joint mechanism 560 causes the wrist portion 246 to pivot on a pivot O7' that is orthogonal to the pivot O6', in relation to the second forearm portion 245. The torsion mechanism 570 causes the coupling portion 247 to pivot (twist) on a pivot O8' that is orthogonal to the pivot O7', in relation to the wrist portion 246. Such a multi-joint arm 240 can realize bending and stretching of the joints (shoulder, elbow and wrist) and twisting of the upper arm and the forearm, as in a human arm part, with a relatively simple configuration.

The configurations of the joint mechanism 510, the joint mechanism 520, the torsion mechanism 530, the joint mechanism 540, the torsion mechanism 550, the joint mechanism 560 and the torsion mechanism 570 in this embodiment are similar to that of the joint mechanism 310, though the configuration of each of these mechanisms is not particularly limited. That is, as shown in FIG. 4, the joint mechanism 510 has a motor 511 as a drive source, a decelerator (not shown) that reduces the rotational speed of the motor 511, and a position sensor 512 that detects the rotation angle of the motor 511. The joint mechanism 520 has a motor 521 as a drive source, a decelerator (not shown) that reduces the rotational speed of the motor 521, and a position sensor 522 that detects the rotation angle of the motor 521. The torsion mechanism 530 has a motor 531 as a drive source, a decelerator (not shown) that reduces the rotational speed of the motor 531, and a position sensor 532 that detects the rotation angle of the motor 531. The joint mechanism 540 has a motor 541 as a drive source, a decelerator (not shown) that reduces the rotational speed of the motor 541, and a position sensor 542 that detects the rotation angle of the motor 541. The torsion mechanism 550 has a motor 551 as a drive source, a decelerator (not shown) that reduces the rotational speed of the motor 551, and a position sensor 552 that detects the rotation angle of the motor 551. The joint mechanism 560 has a motor 561 as a drive source, a decelerator (not shown) that reduces the rotational speed of the motor 561, and a position sensor 562 that detects the rotation angle of the motor 561. The torsion mechanism 570 has a motor 571 as a drive source, a decelerator (not shown) that reduces the rotational speed of the motor 571, and a position sensor 572 that detects the rotation angle of the motor 571.

End Effector

The end effectors 610, 620 have, for example, the function of grasping an object. Although the configuration of the end effectors 610, 620 varies depending on the work to be executed, the end effectors 610, 620 may have, for example, first fingers 611, 621 and second fingers 612, 622, as shown in FIG. 3. In the end effectors 610, 620 of such a configuration, the distance between the first fingers 611, 621 and the second fingers 612, 622 can be adjusted to grasp an object.

As shown in FIGS. 6 and 7, the end effectors 610, 620 can operate in the three directions (three dimensions) of x-axis direction, y-axis direction and z-axis direction.

Force Sensor

The force sensors 740, 750 are attached between the coupling portions 237, 247 and the end effectors 610, 620 (see FIG. 3). The force sensors 740, 750 have the function of detecting external forces applied to the end effectors 610, 620. As the forces detected by the force sensors 740, 750 are fed back to the robot control device 900, the robot 100 can execute work more precisely. Based on the forces and moments detected by the force sensors 740, 750, whether the end effectors 610, 620 contact an obstacle or the like can be detected. Therefore, obstacle evasion, object damage evasion and the like can be easily carried out.

The force sensors 740, 750 are not particularly limited as long as the force sensors can detect the force component and the moment component on each of the three axes that are orthogonal to each other, and known force sensors can be used.

Robot Control Device

As shown in FIG. 4, the robot control device 900 has a storage unit 930 and can cause the trunk 220 and the multi-joint arms 230, 240 to operate separately.

The storage unit 930 has a storage medium (also referred to as a recording medium) on which various kinds of information, data, tables, arithmetic formulas, programs and the like are stored (or recorded). This storage medium may include, for example, a volatile memory such as RAM, a non-volatile memory such as ROM, a rewritable (erasable, rewritable) non-volatile memory such as EPROM, EEPROM or flash memory, various semiconductor memories, IC memories or the like.

The robot control device 900 can separately control the driving of the motor 311 and the motors 411 to 471 (first drive motors) and 511 to 571 (second drive motors) provided in the respective joint mechanisms 310, 410, 420, 440, 460, 510, 520, 540, 560 and the respective torsion mechanisms 430, 450, 470, 530, 550, 570, via a motor driver or the like. In other words, the mechanism of the multi-joint arm 230 and the mechanism of the multi-joint arm 240 can be made different from each other.

In this case, the robot control device 900 causes the position sensors 312, 412 to 472, 512 to 572 to detect the angular velocities and the rotational angles or the like of the respective motors 311, 411 to 471, 511 to 571, and controls the driving of the respective motors 311, 411 to 471, 511 to 571, based on the results of the detection. A control program for this is stored in advance in a storage medium, not shown, provided within the robot control device 900.

Specifically, as shown in FIG. 4, the robot control device 900 has a first drive source control unit 901 that controls the driving of the motor 311, a second drive source control unit 902 that controls the driving of the motor 411, a third drive source control unit 903 that controls the driving of the motor 421, a fourth drive source control unit 904 that controls the driving of the motor 431, a fifth drive source control unit 905 that controls the driving of the motor 441, a sixth drive source control unit 906 that controls the driving of the motor 451, a seventh drive source control unit 907 that controls the driving of the motor 461, an eighth drive source control unit 908 that controls the driving of the motor 471, a ninth drive source control unit 909 that controls the driving of the motor 511, a tenth drive source control unit 910 that controls the driving of the motor 521, an eleventh drive source control unit 911 that controls the driving of the motor 531, a twelfth drive source control unit 912 that controls the driving of the motor 541, a thirteenth drive source control unit 913 that controls the driving of the motor 551, a fourteenth drive source control unit 914 that controls the driving of the motor 561, and a fifteenth drive source control unit 915 that controls the driving of the motor 571.

The configurations of the first to fifteenth drive source control unit 901 to 915 are similar to each other. Therefore, the first drive source control unit 901 will be described hereinafter as a representative example.

As shown in FIG. 5, the first drive source control unit 901 has a subtractor 901a, a position control unit 901b, a subtractor 901c, an angular velocity control unit 901d, a rotation angle calculation unit 901e, and an angular velocity calculation unit 901f. A position command Pc of the motor 311 and a detection signal from the position sensor 312 are inputted to the first drive source control unit 901. The first drive source control unit 901 drives the motor 311 through feedback control using each detection signal so that the rotation angle (position feedback value Pfb) of the motor 311 that is calculated based on the detection signal from the position sensor 312 becomes a position command Pc and so that an angular velocity feedback value ωfb becomes an angular velocity command ωc, described later.

That is, the position command Pc is inputted to the subtractor 901a, and a position feedback value Pfb, described later, is also inputted to the subtractor 901a from the rotation angle calculation unit 901e. At the rotation angle calculation unit 901e, the number of pulses inputted from the position sensor 312 is counted and the rotation angle of the motor 311 corresponding to the count value is outputted to the subtractor 901a as a position feedback value Pfb. The subtractor 901a outputs the difference between the position command Pc and the position feedback value Pfb (the value resulting from subtracting the position feedback value Pfb from the target value of the rotation angle of the motor 311) to the position control unit 901b.

The position control unit 901b carries out predetermined arithmetic processing using the difference inputted from the subtractor 901a and a proportional gain that is a predetermined coefficient, and thereby calculates a target value of the angular velocity of the motor 311 corresponding to the difference. The position control unit 901b outputs a signal representing the target value (command value) of the angular velocity of the motor 311 to the subtractor 901c as an angular velocity command ωc.

At the angular velocity calculation unit 901f, the angular velocity of the motor 311 is calculated, based on the frequency of a pulse signal inputted from the position sensor 312, and this angular velocity is outputted to the subtractor 901c as an angular velocity feedback value ωfb.

The angular velocity command ωc and the angular velocity feedback value ωfb are inputted to the subtractor 901c. The subtractor 901c outputs the difference between the angular velocity command ωc and the angular velocity feedback value ωfb (the value resulting from subtracting the angular velocity feedback value ωfb from the target value of the angular velocity of the motor 311) to the angular velocity control unit 901d.

The angular velocity control unit 901d carries out predetermined arithmetic processing including integral, using the difference inputted from the subtractor 901c and a proportional gain, integral gain or the like that are predetermined coefficients, and thereby generates a drive signal of the motor 311 corresponding to the difference and supplies the drive signal to the motor 311 via the motor driver.

Thus, feedback control is made so that that the position feedback value Pfb and the position command Pc become as equal as possible and so that the angular velocity feedback value ωfb and the angular velocity command ωc become as equal as possible. The driving of the motor 311 (pivoting of the trunk 220) is thus controlled.

Now, in some cases, the robot 100 may carry out assembly or the like of a product in collaboration with a worker (human) 1000. Hereinafter, an example of such a case will be described.

As shown in FIG. 6, the robot 100 carries out assembly work of assembling a first structure K1 and a second structure K2 together. The worker 1000 produces the first structure K1 and supplies the first structure K1 to the robot 100. These processes of work are carried out on a worktable 800A and a worktable 800B.

The worktable 800A and the worktable 800B are rectangular, as viewed from the positive side on the z-axis and are arranged side by side along the x-axis direction.

The worker 1000 is arranged in front of the worktable 800A (on the left-hand side in FIG. 6), and the robot 100 is arranged in front of the worktable 800B (on the left-hand side in FIG. 6). In this way, the robot 100 and the worker 1000 are close to each other.

In this state where the robot 100 and the worker 1000 are close to each other, the worker 1000 carries out work on the worktable 800A. Hereinafter, the space where the worker 1000 carries out work is called a human work area N.

Meanwhile, the robot 100 carries out work on the worktable 800B. The multi-joint arm 230 of the robot 100 carries out work on the proximal side to the worker 1000, and the multi-joint arm 240 carries out work on the distal side from the worker 1000.

The multi-joint arm 230 can separately move each of the components from the first shoulder portion 231 to the end effector 610. In this case, the multi-joint arm 230 can operate in the three directions (three dimensions) of x-axis direction, y-axis direction and z-axis direction, as described above. Hereinafter, the space where the multi-joint arm 230 can operate is called a first operation area 230A. In FIG. 7, the first operation area 230A is hatched downward to the right.

Of the first operation area 230A, the space where the end effector 610 can operate is called a first work area 230B. The first work area 230B is the space where the end effector 610 carries out, for example, work such as grasping the first structure K1. In FIG. 7, the first work area 230B is hatched downward to the right more densely.

The multi-joint arm 240 can separately move each of the components from the first shoulder portion 241 to the end effector 620. In this case, the multi-joint arm 240 can operate in the three directions (three dimensions) of x-axis direction, y-axis direction and z-axis direction, as described above. Hereinafter, the space where the multi-joint arm 240 can operate is called a second operation area 240A. In FIG. 7, the second operation area 240A is hatched upward to the right.

Of the second operation area 240A, the space where the end effector 620 can operate is called a second work area 240B. The second work area 240B is the space where the end effector 620 carries out, for example, work such as grasping the second structure K2. In FIG. 7, the second work area 240B is hatched upward to the right more densely.

As shown in FIG. 7, a part of the first work area 230B and a part of the second work area 240B overlap with each other, and the assembly work is carried out in this overlap area S (the cross-hatched area in FIG. 7). The assembly work is carried out as follows.

As shown in FIG. 6, the multi-joint arm 230 grasps the first structure K1, moves the first structure K1 to the overlap area S and becomes stationary. Meanwhile, the multi-joint arm 240 grasps the second structure K2 and assembles the second structure K2 to the first structure K1 that is stationary in the overlap area S, by moving closer thereto in the direction of arrow B in FIG. 6.

As described above, when the robot 100 and the worker 1000 collaborate, sufficient safety for the worker 1000 needs to be secured. In the robot 100, in order to realize this, the following operation conditions are stored in the storage unit 930 of the robot control device 900.

First, as shown in FIG. 6, the first operation area 230A is set to be located on the worktable 800B side of the boundary 2000 between the worktable 800A and the worktable 800B. This ensures that the first operation area 230A and the human work area N can be prevented from overlapping with each other. Thus, the worker 1000 and the multi-joint arm 230 can be prevented from contacting each other.

Moreover, the first operation area 230A is located on the worktable 800B at a predetermined distance from the boundary 2000. Thus, the worker 1000 can feel a sense of security. Furthermore, even if the worker 1000 enters to the worktable 800B side over the boundary 2000, the first operation area 230A can be spaced apart from the human work area N as the first operation area 230A is located at the predetermined distance from the boundary 2000. Thus, the robot 100 secures higher safety.

Also, as shown in FIG. 6, the first operation area 230A is located further on the negative side on the x-axis than an imaginary line 3000 in the y-axis direction that passes along the first shoulder portion 231. Thus, the worker 1000 can recognize the position of the first operation area 230A with reference to the position of the first shoulder portion 231 and therefore can feel a higher sense of security.

Moreover, for example, even if the length of the worktable 800B in the x-axis direction is short and the distance between the robot 100 and the worker 1000 is shorter than in the illustrated configuration, safety as described above can be secured by arranging the robot 100 in such a way that the first shoulder portion 231 is located further on the negative side on the x-axis than the boundary 2000.

Meanwhile, the limit of the second operation area 240A on the negative side on the x-axis is the side of the worktable 800B on the negative side on the x-axis. Thus, the second operation area 240A can secure as large a work space as possible. Therefore, since the multi-joint arm 240 can freely change posture within this sufficient work space, the work efficiency of the multi-joint arm 240 is improved. Consequently, the work efficiency of the robot 100 as a whole can be maintained.

The first operation area 230A is set to be smaller than the second operation area 240A. That is, the volume of the first operation area 230A is set to be smaller than the volume of the second operation area 240A. The volume of the first operation area 230A may be preferably set to be 10% or greater and 70% or smaller, and more preferably 30% or greater and 50% or smaller of the volume of the second operation area 240A. This enables the multi-joint arm 230 to secure safety as described above and to prevent its work efficiency from falling due to a reduction in work space to secure safety. Therefore, both safety and productivity (work efficiency) can be realized.

As long as the volume of the first operation area 230A is set to be smaller than the volume of the second operation area 240A, the dimensional relation between the width (length in the x-axis direction) W1, the height (length in the z-axis direction) H1 and the depth (length in the y-axis direction) L1 of the first operation area 230A, and the width (length in the x-axis direction) W2, the height (length in the z-axis direction) H2 and the depth (length in the y-axis direction) L2 of the second operation area 240A is not particularly limited. In this embodiment, it is preferable that the width W1, height H1 and depth L1 of the first operation area 230A are set to be smaller than the width W2, height H2 and depth L2 of the second operation area 240A, respectively. This ensures that safety can be secured as described above, regardless of whether the robot enters the worktable 800B from the x-axis direction, the y-axis direction or the z-axis direction (see FIGS. 6 and 8).

Here, in some cases, the worker 1000 may be expected to enter into the first operation area 230A in order supply the first structure K1 to the worktable 800B or may be expected to enter into the first operation area 230A accidentally. However, since the following operation conditions are stored in the storage unit 930, the robot 100 can exhibit high safety even in such cases.

The operation speed of the multi-joint arm 230 is set to be slower than the operation speed of the multi-joint arm 240. This enables the worker 1000 to feel a higher sense of security. Even if the worker 1000 enters into the first operation area 230A, the worker 1000 can easily exit the first operation area 230A before contacting the multi-joint arm 230 as the operation of the multi-joint arm 230 is slower than the operation speed of the multi-joint arm 240. Moreover, even if the worker 1000 contacts the multi-joint arm 230 unexpectedly, the impact on the worker 1000 is reduced. Thus, the robot 100 has higher safety.

The operation speed (average operation speed) of the multi-joint arm 230 may be preferably set to be 0% or higher and 70% or lower, and more preferably 20% or higher and 50% or lower of the operation speed (average operation speed) of the multi-joint arm 240. This enables the worker 1000 to feel a sense of safety as described above and enables the multi-joint arm 230 to carry out work sufficiently.

To lower the operation speed of the multi-joint arm 230 below the operation speed of the multi-joint arm 240, for example, the voltage applied to the motors 411 to 471 of the multi-joint arm 230 is set to be lower than the voltage applied to the motors 511 to 571 of the multi-joint arm 240. Thus, further advantages can be achieved in addition to the high safety of the robot 100 as described above.

As a result of the above, the rotational speed of the motors 411 to 471 is lower than the rotational speed of the motors 511 to 571. That is, the number of rotations of the motors 411 to 471 is smaller than the number of rotations of the motors 511 to 571. This enables a reduction in the amount of wear of the motors 411 to 471 and therefore longer service life of the motors 411 to 471.

Moreover, the current flowing through the motors 411 to 471 is smaller than the current flowing through the motors 511 to 571. Therefore, the amount of heat generated by the motors 411 to 471 can be made smaller than the amount of heat generated by the motors 511 to 571. Thus, failure, deterioration and the like due to heat generation in the multi-joint arm 230 can be restrained.

Furthermore, the torque of the motors 411 to 471 can be made smaller than the torque of the motors 511 to 571. Therefore, for example, if the multi-joint arm 230 and the multi-joint arm 240 collide with each other, for example, due to the influence of an earthquake or the like, the multi-joint arm 230 is damaged preferentially over the multi-joint arm 240. Therefore it is possible to use the robot 100 again, simply by replacing or repairing the multi-joint arm 230.

As described above, in the overlap area S, the multi-joint arm 230 is set to hold the first structure K1 in a stationary state and the multi-joint arm 240 is set to move the second structure K2 toward the first structure K1 in the direction of arrow B in FIG. 6 and then assemble the structures together. In this way, in the robot 100, different works are set for the multi-joint arm 230 and the multi-joint arm 240. This can reduce dynamic work by the multi-joint arm 230 on the proximal side to the worker 1000 to a minimum level, and therefore enables the worker 1000 to feel a higher sense of security.

If the multi-joint arm 230 and the multi-joint arm 240 are about to contact each other in the overlap area S, the multi-joint arm 230 is set to restrain its operation and the multi-joint arm 240 is set to operate preferentially. This can prevent unexpected collision between the multi-joint arm 230 and the multi-joint arm 240 and can reduce the operation of the multi-joint arm 230 further.

In the robot 100, when starting up the multi-joint arm 230 and the multi-joint arm 240 from the state where the robot main body 200 is not yet driven, the multi-joint arm 240 is set to be started up before the multi-joint arm 230. That is, when starting up the multi-joint arm 230 and the multi-joint arm 240, the multi-joint arm 230 is set to be started a predetermined time after the multi-joint arm 240 is started up. Therefore, the worker 1000 can confirm that the multi-joint arm 240 is started up, and can predict the startup of the multi-joint arm 230 following the multi-joint arm 240. Thus, the robot 100 can exhibit higher safety.

As the robot control device 900 controls the driving of the multi-joint arm 230 and the multi-joint arm 240 with the above settings, safety for the worker 1000 can be securely reliably.

The above describes the case where the worker 1000 carries out work on the side of the multi-joint arm 230.

However, in some cases, the worker 1000 may preferably carry out work on the side of the multi-joint arm 240. In such a case, the setting can be changed so that the second operation area 240A becomes smaller than the first operation area 230A. That is, as shown in FIG. 9, the size of the second operation area 240A can be made equal to the size of the first operation area 230A shown in FIG. 6, and the size of the first operation area 230A can be made equal to the size of the second operation area 240A shown in FIG. 6. This enables the worker 1000 to carry out work safely even on the side of the multi-joint arm 240. In this case, it is preferable that the dimensional relation between the first operation area 230A and the second operation area 240A, and the operation speeds and dynamic work of the multi-joint arm 230 and the multi-joint arm 240 are reversed.

In this way, the robot 100 can switch between the state where the multi-joint arm 230 is an "inferior arm" having a small operation area while the multi-joint arm 240 is a "superior arm" having a large operation area, and the state where the multi-joint arm 240 is the "inferior arm" while the multi-joint arm 230 is the "superior arm".

The selection about whether the human work area N is set on the side of the first operation area 230A or on the side of the second operation area 240A is carried out, for example, by operating a button displayed on the monitor 270.

Next, the operation of the robot 100 will be described with reference to the flowchart of FIG. 10.

First, the worker 1000 operates the monitor 270 provided on the back side of the robot 100 and selects which one of the multi-joint arm 230 and the multi-joint arm 240 should be the "superior arm" and which one should the "inferior arm".

The robot control device 900 determines the setting selected by the operation on the monitor 270 (step S1).

If, in step S1, the multi-joint arm 230 is set as the "inferior arm" and the multi-joint arm 240 is set as the "superior arm", as shown in FIGS. 6 to 8, the voltage applied to the motors 411 to 471 of the multi-joint arm 230 is first set to be lower than the voltage applied to the motors 511 to 571 of the multi-joint arm 240 (step S2).

Next, the first operation area 230A of the multi-joint arm 230 is set to be smaller than the second operation area 240A of the multi-joint arm 240 (step S3).

Next, the robot 100 is driven with the conditions that are set in steps S2 and S3 (step S6). Thus, the worker 1000 can carry out work safely in the human work area N on the side of the multi-joint arm 230.

Meanwhile, if, in step S1, the robot control device 900 determines that the multi-joint arm 240 is the "inferior arm" and the multi-joint arm 230 is the "superior arm", as shown in FIG. 9, the voltage applied to the motors 511 to 571 of the multi-joint arm 240 is set to be lower than the voltage applied to the motors 411 to 471 of the multi-joint arm 230 (step S4), as opposed to the above case.

Next, the second operation area 240A of the multi-joint arm 240 is set to be smaller than the first operation area 230A of the multi-joint arm 230 (step S5).

Next, the robot 100 is driven with the conditions that are set in steps S4 and S5 (step S6). Thus, the worker 1000 can carry out work safely in the human work area N on the side of the multi-joint arm 240.

As described above, since one of the first operation area 230A where the multi-joint arm 230 operates and the second operation area 240A where the multi-joint arm 240 operates is set to be smaller than the other, the worker 1000 carrying out work on the side of the smaller one of the first operation area 230A and the second operation area 240A can be prevented from contacting the multi-joint arm that operates in the smaller operation area. The worker 1000 can carry out work safely.

Also, the distance between the worker 1000 and the robot 100 can be reduced. Consequently, on a production line of a predetermined scale, more robots 100 and workers 1000 can be arranged as the distance between the worker 1000 and the robot 100 is short. Therefore, production efficiency can be improved.

Moreover, irrespective of whether the worker 1000 carries out work on the side of the multi-joint arm 230 of the robot 100 or on the side of the multi-joint arm 240, the robot 100 can cope and exhibit high safety.

The operation of the multi-joint arm 230 is simpler than the operation of the multi-joint arm 240. Therefore, the possibility that the multi-joint arm 230 experiences failure is lowered. Thus, when monitoring the operation of the robot 100 via the stereo camera 250 or the like, it is possible to recognize failure of the robot 100, simply by monitoring the multi-joint arm 240. Therefore, the monitoring of the robot 100 can be carried out easily.

While the illustrated embodiment of the robot, the robot control device and the robot control method according to the invention is described above, the invention is not limited to this embodiment. Each element forming the robot and the robot control device can be replaced by an arbitrary element that can achieve a similar function. Also, an arbitrary component may be added.

While the motors that drive one of the two multi-joint arms have a similar configuration to the motors of the other multi-joint arm in the embodiment, the invention is not limited to this configuration. Motors with different rotational speeds, torques and the like may be installed in advance in each multi-joint arm. This enables the operation range, operation speed and the like to differ between the respective multi-joint arms even if the robot control device applies an equal voltage to each multi-joint arm.

Also, while the robot in this embodiment is used in a line production system where a large number of workers and a large number of robots are arrayed side by side to collaborate, the invention is not limited to this configuration. The robot may also be used in a cell production system where a small number of workers and a small number of robots collaborate.

Also, while the robot in the embodiment has two multi-joint arms, the invention is not limited to this configuration and the robot may have three or more multi-joint arms. In such a case, the robot control device performs control so that the operation area of the multi-joint arm that is close to the area where the worker works is smaller than the operation areas of the other multi-joint arms.

Moreover, while a movable robot is described in the embodiment, the robot may be fixed to the floor, ceiling, wall or the like of the work room with bolts or the like.

While the number of rotation axes of the robot is 15 in the embodiment, the invention is not limited to this example. The number of rotation axes of the robot may be 1 to 14, or 16 or greater. The robot is not limited to a two-arm robot and may be a single-arm robot.

Also, while the robot is described as carrying out assembly work in the embodiment, the invention is not limited to this embodiment. The robot may be configured, for example, to carry out processing such as screwing a component. In such a case, it is preferable that the "inferior arm" is set to fix the component on the worktable and that the "superior arm" is set to grasp a tool such as a driver and perform screwing work.

What is claimed is:

1. A robot comprising:
   a first arm;
   a second arm; and
   a control unit that controls driving of the first arm and the second arm
   wherein the control unit is configured to switch between a first state in which the first arm is an inferior arm and the second arm is a superior arm and the second state in which the first arm is the superior arm and the second arm is the inferior arm, and
   the control unit is capable of performing control so that a first operation area where the inferior arm operates is smaller than a second operation area where the superior arm operates.

2. The robot according to claim 1, wherein if an x-axis, a y-axis and a z-axis that are orthogonal to each other are set, the inferior arm and the superior arm operate in the direction of the x-axis, in the direction of the y-axis and in the direction of the z-axis, and that the control unit performs control so that the volume of the first operation area is 10% or greater and 70% or smaller than the volume of the second operation area.

3. The robot according to claim 1, wherein if an x-axis, a y-axis and a z-axis that are orthogonal to each other are set, the control unit performs control so that the lengths of the first operation area in the direction of the x-axis, in the direction of the y-axis and in the direction of the z-axis are shorter than the lengths of the second operation area in the direction of the x-axis, in the direction of the y-axis and in the direction of the z-axis, respectively.

4. The robot according to claim 1, wherein a work area where a distal end of the inferior arm can operate and a work area where a distal end of the superior arm can operate have an overlap area with each other, and that the control unit performs control so that the superior arm operates preferentially in the overlap area.

5. The robot according to claim 1, wherein a human work area where a human carries out work is provided on the side of the inferior arm, and that the control unit performs control so that the first operation area does not overlap with the human work area.

6. The robot according to claim 1, further comprising:
   a first drive motor to drive the inferior arm; and
   a second drive motor to drive the superior arm;
   wherein a voltage applied to the first drive motor is lower than a voltage applied to the second drive motor.

7. The robot according to claim 1, further comprising:
   a first drive motor to drive the inferior arm; and
   a second drive motor to drive the superior arm;
   wherein the rotational speed of the first drive motor is slower than the rotational speed of the second drive motor.

8. The robot according to claim 1, further comprising
   a first drive motor to drive the inferior arm and
   a second drive motor to drive the superior arm,
   wherein the control unit performs control so that the amount of heat generated by the first drive motor is smaller than the amount of heat generated by the second drive motor.

9. The robot according to claim 1, wherein the robot is configured to carry out assembly work of assembling a first structure and a second structure together, and that the control unit, when carrying out the assembly work, performs control so that the inferior arm holds the first structure in a stationary state while the superior arm brings the second structure closer to the first structure.

10. The robot according to claim 1, wherein when starting up the inferior arm and the superior arm, performs control so that the superior arm is started up before the inferior arm.

11. The robot according to claim 1, wherein work area where a human carries out work is provided on the side of one of the first arm and the second arm, and that the control unit performs control so that the first operation area becomes smaller than the second operation area in the state where the work area is set on the side of the first arm, whereas the second operation area becomes smaller than the first operation area in the state where the work area is set on the side of the second arm.

12. A robot comprising:
  a first arm;
  a second arm; and
  a control unit that controls driving of the first arm and the second arm
  wherein the control unit is configured to switch between the first state in which the first arm is an inferior arm and the second arm is a superior arm and the second state in which the first arm is the superior arm and the second arm is the inferior arm, and
  the control unit is capable of performing control so that an operation speed of the first arm is slower than an operation speed of the second arm.

13. The robot according to claim 12, further comprising a first drive motor to drive the inferior arm and a second drive motor to drive the superior arm, and that the control unit performs control so that the torque of the first drive motor is smaller than the torque of the second drive motor.

* * * * *